United States Patent [19]

Hopper

[11] Patent Number: 5,070,150

[45] Date of Patent: Dec. 3, 1991

[54] PROCESS FOR THE SOLID STATE (SOLVENTLESS) HYDROXYLATION OF VINYL-CONTAINING RUBBERS USING A HYDROXYMERCAPTAN

[75] Inventor: Roger J. Hopper, Akron, Ohio

[73] Assignee: The Goodyear Tire & Rubber Company, Akron, Ohio

[21] Appl. No.: 548,326

[22] Filed: Jul. 2, 1990

[51] Int. Cl.$^5$ .............................................. C08F 19/20
[52] U.S. Cl. ................................. 525/350; 525/332.9; 525/333.2
[58] Field of Search ................. 525/350; 526/211, 224

[56] References Cited

U.S. PATENT DOCUMENTS

| 4,150,015 | 4/1979 | Edwards et al. | 260/42.37 |
| 4,230,841 | 10/1980 | Prudence | 526/179 |
| 4,238,575 | 12/1980 | Kleiner et al. | 525/212 |
| 4,357,432 | 11/1982 | Edwards | 523/351 |
| 4,530,959 | 7/1985 | Armbruster et al. | 524/526 |
| 4,946,905 | 8/1990 | Weinstein | 525/350 |

FOREIGN PATENT DOCUMENTS 861051 5/1978 Belgium .
1910177 2/1969 Fed. Rep. of Germany .
1283613 12/1969 United Kingdom .
1575115 11/1977 United Kingdom .

OTHER PUBLICATIONS

CA 66297v Literature Searches.
C. S. Marvel et al. "Polybutadiene Modified by Addition of Thiols Containing Polar Groups", Ind. Eng., Chem. 45, 2090 (1953).
T, Kempermann, "Sulfur-Free Vulcanization Systems for Diene Rubber", Rubber Division American Chemical Society Meeting, Cleveland, Ohio, Oct. 6-9, 1987.

*Primary Examiner*—Christopher Henderson
*Attorney, Agent, or Firm*—Bruce J. Hendricks

[57] ABSTRACT

The present invention relates to a process for preparing hydroxylated rubber by reacting (a) a rubber having from about 5 to about 75 percent of a 1,2-double bond content with (b) a mercaptan of the formula:

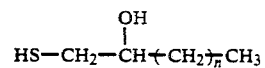

wherein n is an itneger of from 3 to 19; and wherein the reaction is conducted in the solid state and is catalyzed by a free radical catalyst.

11 Claims, No Drawings

PROCESS FOR THE SOLID STATE (SOLVENTLESS) HYDROXYLATION OF VINYL-CONTAINING RUBBERS USING A HYDROXYMERCAPTAN

BACKGROUND OF THE INVENTION

Hydroxylated rubbers, for example, hydroxylated polybutadiene are known to improve the properties of silica filled mixtures. For example, in GB 1,575,115 there is disclosed a process for the production of a hydroxy-modified polybutadiene involving reacting a polybutadiene having a vinyl double bond content of from 30 to 60 percent with a hydroxy-mercaptan compound. Examples of suitable mercaptans disclosed in this reference include 2-mercaptoethanol, 2-mercapto-2-propanol, 1-phenyl-2-mercaptoethanol, 3-mercaptopropanol and 4-mercaptobutanol. The process is carried out in an inert solvent, 2.3-9.0 parts by weight per part of polybutadiene, and is initiated by a free radical catalyst such as azobisisobutyronitrile (AIBN). The AIBN catalyzed reaction of 2-mercaptoethanol with polybutadiene in an inert solvent has, in fact, been known for many years (C.S. Marvel, K.G. Clarke, H.K. Inskip, W.K. Taft and B.G. Labbe, Industrial and Engineering Chemistry, Volume 45, No. 9, pp. 2090-2093 (1953)).

In these prior art processes, the use of relatively large amounts of solvent has practical disadvantages, including the need for large volume reactors, as well as auxiliary equipment for the separation and purification of the solvent. Solvent recovery generally requires a distillation step, contributing substantially to energy costs. Furthermore, relatively long reaction times, 2 hours or more, are employed in these solvent-based processes thus limiting production efficiency. Therefore, there exists a need for a process for the efficient hydroxylation of vinyl-containing rubbers which avoids the disadvantages of the prior art.

SUMMARY OF THE INVENTION

The present invention relates to the solid state (solventless) hydroxylation of vinyl-containing rubbers. The process consists of the direct reaction of higher molecular weight, less volatile hydroxymercaptans with the rubbers in a mixer-kneader such as a Banbury mixer or extruder Such a process avoids the prior art disadvantages associated with solvent handling, long reaction times and the use of hydroxymercaptan having high volatility, stench and toxicity.

DETAILED DESCRIPTION OF THE INVENTION

The present invention relates to a process for preparing a hydroxylated rubber comprising reacting (a) a rubber having from about 5 to about 75 percent of a 1,2-double bond (vinyl) content with (b) a mercaptan of the formula:

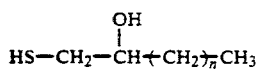

wherein n is an integer of from 3 to about 19; and wherein the reaction is conducted in the solid state and is catalyzed by a free radical catalyst.

Mercaptans of the above formula may be used to modify vinyl containing rubbers in accordance with the present invention. Preferably, n in the above formula is an integer of from about 3 to about 15. Representative of the mercaptans include 2-hydroxy-hexanethiol, 2-hydroxy-heptanethiol, 2-hydroxy-octanethiol, 2-hydroxy-nonanethiol, 2-hydroxy-decanethiol, 2-hydroxy-undecanethiol, 2-hydroxyl-dodecanethiol, 2-hydroxy-tridecanethiol, 2-hydroxy-tetradecanethiol, 2-hydroxy-pentadecanethiol, 2-hydroxy-hexadecanethiol, 2-hydroxy-heptadecanethiol, 2-hydroxy-octadecanethiol, 2-hydroxy-nonadecanethiol, 2-hydroxy-eicosanethiol, 2-hydroxy-heneicosanethiol, and 2-hydroxy-docosanethiol. These hydroxy mercaptans may be prepared in accordance with the established methods known to those skilled in the art wherein a 1-olefin is first epoxidized with e.g. hydrogen peroxide (C. Venturello and R D'Aloisio, Journal of Organic Chemistry, Volume 53, pp. 1553-1557 (1988)). The resulting 1,2-epoxide is then reacted with hydrogen sulfide to produce the hydroxy mercaptan (W. Umbach, R. Mehren, and W. Stein, Fette, Seifen, Anstrichm Volume 71, pp. 199-203 and 1014-1015 (1969)). The preferred mercaptans are 2-hydroxyoctanethiol, 2-hydroxydecanethiol, 2-hydroxydodecanthiol, 2-hydroxytetradecanethiol, and 2-hydroxyhexadecanethiol.

The rubbers which may be modified by the process of the present invention are characterized by having a 1,2-double bond content, also referred to as vinyl content of from about 5 to about 75 percent. Preferably, the rubber has a 1,2-double bond content ranging from about 10 to 55 percent. Suitable rubbers are essentially $C_4$-$C_6$ conjugated diolefin polymers and copolymers of $C_4$-$C_6$ conjugated diolefins and at least one other copolymerizable vinyl or vinylidene-containing monomer. Examples of such suitable polymers include polybutadiene and butadiene-styrene polymers. The rubbers which may be modified by the present process are solid high molecular weight materials, having Mooney viscosities within the range of from about (ML 1+4 at 100° C.) 30 to about 150. A particularly preferred rubber is known to those skilled in the art as a medium vinyl polybutadiene having from about 30 to about 55 percent vinyl content. The medium vinyl polybutadiene typically has about 10 to about 40 percent of monomer units in a cis-1,4-configuration, and after allowing for the vinyl content, i.e., 1,2-monomer configuration, the remainder of the polymer is considered to be in the trans-1,4-configuration. A particularly preferred medium vinyl polybutadiene has 10 to 40 percent of its monomer units in a cis-1,4-configuration, 30 to 55 percent of its units in a 1,2-configuration and the remaining percentage of its monomer units in a trans-1,4-configuration. Such preferred medium vinyl polybutadiene may be prepared by polymerizing 1,3-butadiene with a very small amount of divinylbenzene in a hydrocarbon solvent system, preferably in essentially non-polar aprotic solvent, with an alkyllithium catalyst, and one or more polar catalyst modifiers to effect the polymer's vinyl content. For further details concerning medium vinyl polybutadiene and its method of preparation, reference may be made to U.S. Pat. No. 4,230,841 which is hereby incorporated by reference in its entirety.

The amount of mercaptan needed to modify a given rubber depends upon a number of factors including the specific nature of the rubber being modified, the characteristics desired for the final vulcanizate, and the molecular weight of the mercaptan. As a general rule, from about 2 to about 10 phr (parts per hundred parts of rubber) of the mercaptan will be utilized. In most cases, it will be preferred to utilize from about 3 to about 7 phr of the mercaptan. As a general rule, the molar ratio of mercaptan to unsaturated sites in the polymer will be within the range of from about 0.05:1 to about 0.15:1, but is preferably in the range of from about 0.05:1 to about 0.12:1 and more preferably from about 0.05:1 to about 0.10:1.

The reaction between the rubber and the mercaptan is catalyzed by a free radical catalyst. Representative of the conventional free radical catalysts that may be used include alkyl hydroperoxides, dialkyl peroxides, acyl peroxides or azonitriles. Specific examples of suitable catalysts are t-butyl hydroperoxide, p-menthane hydroperoxide, di-t-butyl peroxide, di-cumyl peroxide, lauoryl perioxide, t-butyl perbenzoate, 1,1'-azobis(cyclohexane-carbonitrile) and azobisisobutyronitrile (AIBN). AIBN is the preferred catalyst. As one skilled in the art can appreciate, the level of catalyst may vary depending on the amount of reactants and the particular catalyst that is used. Generally speaking, the amount of catalyst relative to hydroxythiol will range from about 0.5 to about 20 weight percent with a range of from about 2 to about 10 weight percent being preferred.

The solid state reaction of the process of the present invention will be preferably carried out in an mixer-kneader such as a Banbury mixer or an extruder. Such modifications are carried out by simply mixing the mercaptan throughout the rubber being modified. Such modifications are normally conducted at a temperature which is in a range of from about 60° C. to about 165° C. It is generally preferable for such modification procedures to be carried out at a temperature which is within the range of from about 80° C. to about 150° C. with temperatures within the range of from about 80° C. to about 135° C. being most preferred.

The level of modification of the rubber with the hydroxy mercaptan can vary. For example, the level of bound OH in moles per kilogram of modified rubber may range from about 0.02 to about 0.50. Preferably, the level of bound OH ranges from about 0.05 mole per kilogram to about 0.40.

The following examples are presented for the purpose of illustrating and not limiting the present invention.

EXAMPLE 1-15

In these examples, a series of a 235 gram samples of a solution medium vinyl polybutadiene (45% 1,2-butadiene/55% 1,4-butadiene, Tg=−64° C.), and a solution medium vinyl styrene butadiene rubber (43% 1,2-butadiene/47%, 1,4-butadiene/10% styrene, Tg=−44° C.) were modified in the solid state by the addition of 2-hydroxy-decanethiol (HDT). The solid state modifications were carried out in a Brabender Prep Mixer (420 cc) equipped with cam blades and a ram drilled to permit nitrogen purging. The mixer was powered by a microprocessor controlled drive unit (Model PLD-651) which recorded torque and temperature. When used, nitrogen was introduced at a rapid rate throughout the run, except for a brief period during azobisisobutyronitrile (AIBN) addition. The mixing procedure involved adding the 235 grams of the base polymer and mixing until the torque had just passed its initial peak. Then HDT was added portionwise over about 1 minute, followed quickly by the addition of the 0.5 grams of the AIBN. After the desired mixing time, the modified polybutadiene was discharged and air cooled at room temperature. The samples for analysis were acetone extracted and dried.

The results of the solid state additions are summarized in Table I below. The extent of modification expressed as moles of bound HDT per kilogram of modified polymer was determined from elemental analysis for sulfur.

TABLE I

| | | | | | | Mix Parameters after AIBN Add'n | | | |
|---|---|---|---|---|---|---|---|---|---|
| Example | Polymer | HDT, g | Mixer RPM | Start Temp., °C. | N₂ Purge | Time Min. | Temp., °C. | Bound HDT Mol/Kg[3] | Conversion % |
| 1 | MBD[1] | 20 | 60 | 62 | Y | 20 | 105–146 | — | — |
| 2 | MBD | 20 | 50 | 44 | Y | 20 | 101–141 | 0.38 | 93 |
| 3 | MBD | 20 | 40 | 56 | Y | 20 | 101–133 | 0.38 | 93 |
| 4 | MBD | 20 | 40 | 44 | Y | 20 | 90–132 | 0.41 | 100 |
| 5 | MBD | 20 | 40 | 58 | Y | 10 | 100–127 | 0.38 | 93 |
| 6 | MBD | 20 | 60 | 60 | N | 15 | 104–151 | 0.36 | 88 |
| 7 | MBD | 15 | 60 | 54 | N | 15 | 100–147 | 0.28 | 90 |
| 8 | MBD | 15 | 60 | 59 | N | 13 | 102–150 | 0.26 | 84 |
| 9 | MBD | 10 | 60 | 59 | N | 15 | 101–153 | 0.18 | 86 |
| 10 | MSBR[2] | 20 | 50 | 52 | Y | 15 | 94–142 | 0.35 | 85 |
| 11 | MSBR | 20 | 40 | 45 | Y | 20 | 78–123 | 0.31 | 76 |
| 12 | MSBR | 20 | 60 | 57 | N | 20 | 100–145 | 0.32 | 78 |
| 13 | MSBR | 20 | 60 | 65 | N | 16 | 105–153 | 0.35 | 85 |
| 14 | MSBR | 10 | 60 | 58 | N | 20 | 102–137 | 0.16 | 76 |
| 15 | MSBR | 10 | 60 | 65 | N | 20 | 105–139 | 0.15 | 71 |

[1]Solution medium vinyl polybutadiene (45% 1,2-butadiene/55% 1,4-butadiene)
[2]Solution medium vinyl styrene-butadiene rubber (43% 1,2-butadiene/47% 1,4-butadiene/10% styrene)
[3]Calc'd from S analysis

EXAMPLES 16-22

In these examples, Cariflex® S-1215 (37% 1,2-butadiene, 40% 1,4-butadiene, 23% styrene) was modified by addition of 2-hydroxydecanthiol (HDT). Cariflex® S-1215 was commercially available from Shell Chemical Company. The solid state modifications were carried out in a Brabender Prep Mixer (420 cc) equipped with cam bladed rotors and a ram closure. The ram was drilled to permit a nitrogen stream to exit at its bottom face, and was fitted with extra weights to exert an effective load of 22 Kg. The drive unit was a 5 hp Brabender Type EPL-V5501 Electronic Plastic-Corder. A Haake Model N3-B circulator supplied thermostatted oil to the mixer. Mixing torque and bowl temperature were logged.

The general procedure for reactive mixing involved starting the nitrogen purge, adding the vinyl containing rubber, warming to the desired temperature, then adding the HDT and AIBN. After all ingredients were added, mixing was continued through the "Reactive Mix Period (Table II). Variations in oil circulator temperature (50-60° C.) and rotor speed (30-50 rpm) were employed in the individual examples, primarily to control the temperature profile during the reactive mix period.

The results in Table II illustrate that, in some cases, attempts to increase percent conversion by employing higher reactive mixing temperatures, longer reaction times, or higher catalyst levels can produce a gelled product. As those skilled in the art will recognize, such conditions are to be avoided since high levels of gel render the rubber difficult or impossible to process in subsequent manufacturing operations.

TABLE II

| | Modification of Cariflex ® S-1215 with HDT in Brabender Mixer | | | | | | |
|---|---|---|---|---|---|---|---|
| | Reactants, g | Reactive Mix Period | | | Bound HDT | Conversion | |
| Example | Rubber/HDT/AIBN | Time, Min. | Temp. °C. | RPM[1] | Mol/kg | % | Soly.[3] |
| 16 | 252.0/7.1/0.6 | 13.7 | 89-120 | 40 | 0.11 | 79 | Sol. |
| 17 | 247.0/12.0/0.6 | 20.0 | 87-110 | 30 | 0.10 | 41 | Sol. |
| 18 | 247.0/12.0/0.6 | 9.3 | 91-115 | 40 | 0.17 | 70 | Sol. |
| 19 | 256.5/12.5/0.6 | 7.3 | 94-120 | 40 | 0.21 | 86 | Gel. |
| 20 | 247.0/21.0/0.6 | 7.0 | 101-135 | 50 | 0.30 | 73 | Sol. |
| 21 | 247.0/22.0/0.8 | 7.3 | 92-120 | 40 | 0.35 | 82 | Gel. |

[1]Rotor speed corresponding to final torque of reactive mix. Speed during entire run may vary up or down 10 rpm for temperature control.
[2]Calculated from S analysis.
[3]Solubility in chloroform, 1.5 g/25 mL.

EXAMPLES 23-25

These examples, listed in Table III, illustrate the reactions of different 2-hydroxyalkanethiols with Solflex ® 1216, a medium vinyl SBR (having a vinyl content of 45%). Solflex ® 1216 is commercially available from The Goodyear Tire & Rubber Company. The general procedure was as described for Examples 16-22, except no nitrogen purge was used.

TABLE III

| | Modification of Solflex ® 1216 with 2-hydroxyalkanethiols[a] | | | |
|---|---|---|---|---|
| Example | Thiol, g | Reactive Mix | | Bound OH, mol/kg[b] |
| | | Time, min. | Temp. °C. | |
| 23 | 2-hydroxy-octanethiol,19 | 15 | 119-156 | 0.25 |
| 24 | 2-hydroxy-decanethiol,22 | 15 | 121-155 | 0.24 |
| 25 | 2-hydroxy-dodecanethiol,25 | 15 | 118-156 | 0.24 |

[a]Common parameters: 259 g Solflex ® 1216, 0.55 g AIBN, 50 rpm
[b]Calculated from % S analysis

EXAMPLES 26-29

These examples (Table IV) illustrate the modification of rubbers having widely different 1,2-double bond contents. The general procedure was as described for Examples 16-22.

TABLE IV

| | Modification of BR and SBR with HDT[a] | | | | | | |
|---|---|---|---|---|---|---|---|
| | Rubber Composition, wt % | | | | Reactive Mix | | Bound, HDT |
| | Butadiene | | | | | | |
| Example | 1,2- | 1,4- | Styrene | AIBN, g | Time, min. | Temp. °C. | Mol/Kg[b] |
| 26 | 11 | 89 | 0 | 1.3 | 13 | 93-127 | 0.14 |
| 27 | 72 | 28 | 0 | 0.8 | 5 | 97-120 | 0.16 |
| 28 | 8 | 74 | 18 | 1.3 | 14 | 101-128 | 0.10 |
| 29 | 32 | 42 | 26 | 1.8 | 17 | 93-126 | 0.16 |

[a]Common parameters: 255 g rubber, 10 g HDT
[b]Calculated from % S analysis

What is claimed is:

1. A process for solventless hydroxylation of vinyl-containing rubber comprising reacting (a) a vinyl-containing rubber having from about 5 to about 75 percent of a 1,2-double bond content with (b) a mercaptan of the formula

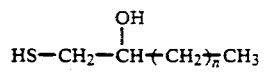

wherein n is an integer of from 3 to 19; and wherein the reaction is conducted in the absence of a solvent at a temperature ranging from 60° C. to about 165° C. and catalyzed by a free radical catalyst.

2. The process of claim 1 wherein said rubber has a 1,2-double bond content ranging from about 10 to about 55 percent.

3. The process of claim 1 wherein said rubber is medium vinyl polybutadiene having 10 to 40 percent of its monomer units in a cis-1,4-configuration, 30 to 55 percent of its monomer units in a 1,2-configuration and the remaining percentage of its monomer units in a trans-1,4-configuration.

4. The process of claim 1 wherein the molar ratio of said mercaptan to 1,2-double bonds in the rubber ranges from about 0.05:1 to about 0.15:1.

5. The process of claim 4 wherein the molar ratio of said mercaptan to 1,2-double bonds in the rubber ranges from about 0.05:1 to about 0.12:1.

6. The process of claim 1 wherein the reaction is conducted at a temperature ranging from about 80° C. to about 150° C.

7. The process of claim 1 wherein n is an integer of from about 3 to 15.

8. The process of claim 1 wherein the free radical catalyst is selected from the group consisting of alkyl hydroperoxides, dialkyl peroxides, acyl peroxides or azonitriles.

9. The process of claim 8 wherein said free radical catalyst is selected from the group consisting of t-butyl hydroperoxide, p-menthane hydroperoxide, di-t-butyl peroxide, dicuryl peroxide, lauoryl peroxide, t-butyl perbenzoate and 1,1'-azobis(cyclohexanecarbonitrile).

10. The process of claim 8 wherein said azo compound is azobisisobutyronitrile.

11. The process of claim 1 wherein said free radical catalyst is present in an amount ranging from about 0.5 to 20 weight percent based on the weight of the hydroxythiol.

* * * * *